(12) United States Patent
Ozaki et al.

(10) Patent No.: US 9,849,989 B2
(45) Date of Patent: Dec. 26, 2017

(54) BED MODE MECHANISM FOR AIRCRAFT PASSENGER SEAT

(71) Applicant: JAMCO Corporation, Mitaka-shi, Tokyo (JP)

(72) Inventors: Masaji Ozaki, Mitaka (JP); Nozomu Tagami, Mitaka (JP); Sanae Ootake, Mitaka (JP)

(73) Assignee: JAMCO CORPORATION, Tokyo (JP)

( * ) Notice: Subject to any disclaimer, the term of this patent is extended or adjusted under 35 U.S.C. 154(b) by 0 days.

(21) Appl. No.: 15/123,044

(22) PCT Filed: Aug. 26, 2014

(86) PCT No.: PCT/JP2014/072255

§ 371 (c)(1),
(2) Date: Sep. 1, 2016

(87) PCT Pub. No.: WO2015/136735

PCT Pub. Date: Sep. 17, 2015

(65) Prior Publication Data

US 2017/0113802 A1    Apr. 27, 2017

(30) Foreign Application Priority Data

Mar. 14, 2014  (JP) ................................. 2014-050943

(51) Int. Cl.
*B64D 11/06*    (2006.01)

(52) U.S. Cl.
CPC ............................... *B64D 11/0641* (2014.12)

(58) Field of Classification Search
CPC ................................................ B64D 11/0641
See application file for complete search history.

(56) References Cited

U.S. PATENT DOCUMENTS

| | | | | |
|---|---|---|---|---|
| 2,208,683 A | * | 7/1940 | Page, Jr. ................ | B64D 11/00 105/315 |
| 2,332,841 A | * | 10/1943 | Buckwalter ............ | B64D 11/06 105/315 |

(Continued)

FOREIGN PATENT DOCUMENTS

| | | |
|---|---|---|
| JP | 2007-524542 A | 8/2007 |
| JP | 2007-526839 A | 9/2007 |

(Continued)

OTHER PUBLICATIONS

International Search Report dated Nov. 25, 2014, issued in counterpart International Application No. PCT/JP2014/072255, w/English translation (5 pages).

(Continued)

*Primary Examiner* — Philip J Bonzell
*Assistant Examiner* — Michael B Kreiner
(74) *Attorney, Agent, or Firm* — Westerman, Hattori, Daniels & Adrian, LLP

(57) ABSTRACT

An aircraft passenger seat (100) has a seat bottom frame (150), and the seat bottom frame (150) is supported by an eccentric cam (210). A seat back frame (170) which rotates about a support point (250) is provided with a damper mechanism (300). When the seat back frame (170) is tilted forward from an upright position about the support point (250), a gas damper (310) is compressed and prevents rapid tilting. This energy assists force for returning the seat back to the upright position. The eccentric cam (210) rotates and lowers the seat bottom frame (150) so as to prevent cushions from being collapsed. A lock mechanism (400) highly rigidly retains the seat back frame at a bed mode position.

8 Claims, 9 Drawing Sheets

(56) References Cited

U.S. PATENT DOCUMENTS

| | | | | |
|---|---|---|---|---|
| 6,000,659 | A * | 12/1999 | Brauer | B64D 11/00 244/118.5 |
| 7,156,462 | B2 * | 1/2007 | Verny | B64D 11/06 297/354.12 |
| 9,033,413 | B2 * | 5/2015 | Round | B64D 11/06 297/232 |
| 2004/0232283 | A1 | 11/2004 | Ferry et al. | |
| 2006/0103203 | A1 | 5/2006 | Williamson et al. | |
| 2007/0126270 | A1 | 6/2007 | Saint-Jalmes et al. | |
| 2010/0308167 | A1 | 12/2010 | Hawkins et al. | |
| 2013/0241246 | A1 | 9/2013 | Round et al. | |

FOREIGN PATENT DOCUMENTS

| | | |
|---|---|---|
| JP | 2008-189301 A | 8/2008 |
| JP | 2011-527653 A | 11/2011 |

OTHER PUBLICATIONS

Written Opinion dated Nov. 25, 2014, issued in counterpart International Application No. PCT/JP2014/072255, w/ English translation (6 pages).

Decision to Grant a Patent dated Sep. 29, 2015, issued in counterpart Japanese Patent Application No. 2014-050943, w/English translation (6 pages).

* cited by examiner

BED MODE MECHANISM FOR AIRCRAFT PASSENGER SEAT

TECHNICAL FIELD

The present invention relates to an improvement of an aircraft passenger seat having a bed mode.

BACKGROUND ART

Passenger seats of aircrafts that fly long distances are equipped with a bed mode. Many of such passenger seats are made flat by reclining the seat further, but since the seats are equipped with cushions designed to realize comfortable seating, there was a drawback in that that seats could not be made completely flat.

Therefore, the following patent literatures disclose a mechanism of tilting a seat back, which is a backrest of the seat, forward to change the seat into a bed.

CITATION LIST

Patent Literature

[PTL 1] Japanese Translation of PCT International Application Publication No. JP-T-2007-524542
[PTL 2] Japanese Unexamined Patent Application Publication No. 2008-189301

SUMMARY OF INVENTION

Technical Problem

FIG. 13 is an explanatory view of an outline of this type of seat.

A seat 1 has a frame 10 supporting both sides of a seat structure, and includes an operation mechanism 20 for reclining the seat or realizing a bed mode of the seat, for example. A seat surface is composed of a seat bottom frame 40 and a cushion 42. A backrest is composed of a seat back frame 60, a backrest cushion 62 and a cushion 64.

A head rest frame 70 is connected to an upper end of the seat back frame 60, and a cushion 72 and a cushion 74 are attached to the head rest frame 70.

In order to convert the position of the seat 1 from the upright position to the bed mode position, the seat back frame 60 is tilted forward together with the head rest frame 70 toward an arrow $B_1$ direction, to realize a flat bed surface.

The seat back frame 60 is locked at the bed mode position.

When the seat back frame is locked at the bed mode position, a drawback occurs in that the seat bottom cushion 42 and the seat back cushion 62 are overlapped at the portion shown by diagonal lines $C_1$, and the cushions are collapsed.

Further, the bed mode position adopts a structure where the seat back frame 60 and the head rest frame 70 are supported in a cantilever by a pin and a lock. Since the weight of the passenger is supported by the cantilever structure, loosening in an arrow $G_1$ direction tends to occur at an upper end portion.

The object of the present invention is to provide a bed mode mechanism of an aircraft passenger seat that solves the problems described above.

Solution to Problem

In order to achieve the above-described object, the present invention provides a bed mode mechanism for an aircraft passenger seat having, as basic means, a frame fixed to a floor surface of an aircraft and supporting both side portions of a structural member of a seat, a seat bottom frame having a rear portion supported by a support point on the frame, an eccentric cam supporting a lower surface of the seat bottom frame, a seat back frame having a lower portion supported by a support point on the frame, a head rest frame connected to an upper portion of the seat back frame, a lock mechanism locking the seat back frame at an upright position where the seat back frame is positioned upright and a bed mode position where the seat back position is tilted forward, and a damper mechanism provided on both side portions of the seat back frame.

A damper unit configuring the damper mechanism is designed to be compressed and store energy by an operation where the seat back frame is tilted from the upright position to the bed mode position, and assist a force when returning the seat back frame to the upright position.

Further, the eccentric cam supporting the lower surface of the seat bottom frame has a function to rotate by the operation where the seat back frame is tilted from the upright position to the bed mode position, and lower the seat bottom frame.

Further, the lock mechanism includes receive members provided on the frame side, a lock pin provided on the seat back frame, a spring biasing the lock pin toward the receive member, and a buckle connected to a handle and pulling out the lock pin from the receive member, wherein a tapered angle of a tapered surface provided on a leading end of the lock pin and a tapered angle of a tapered surface forming a receive surface of the receive member are formed approximately equal.

Further, the damper unit configuring the damper mechanism is a gas damper.

Advantageous Effects of Invention

The aircraft passenger seat according to the present invention equipped the above-described means can be converted rapidly from an upright position where the passenger seat is used as a seat to a bed mode position were the seat is used in a bed mode. The energy generated by tilting the seat is stored in a damper, so that the seat can be prevented from tilting rapidly, and the energy is used to assist the force of returning the seat upright.

When the seat is converted to a bed mode, the seat bottom frame is lowered to reduce the overlap between the seat bottom cushion and the back rest cushion, and the cushions can be prevented from being collapsed. The seat can be locked reliably in the bed mode, and the occurrence of loosening can be prevented.

DESCRIPTION OF EMBODIMENTS

Figure 1:
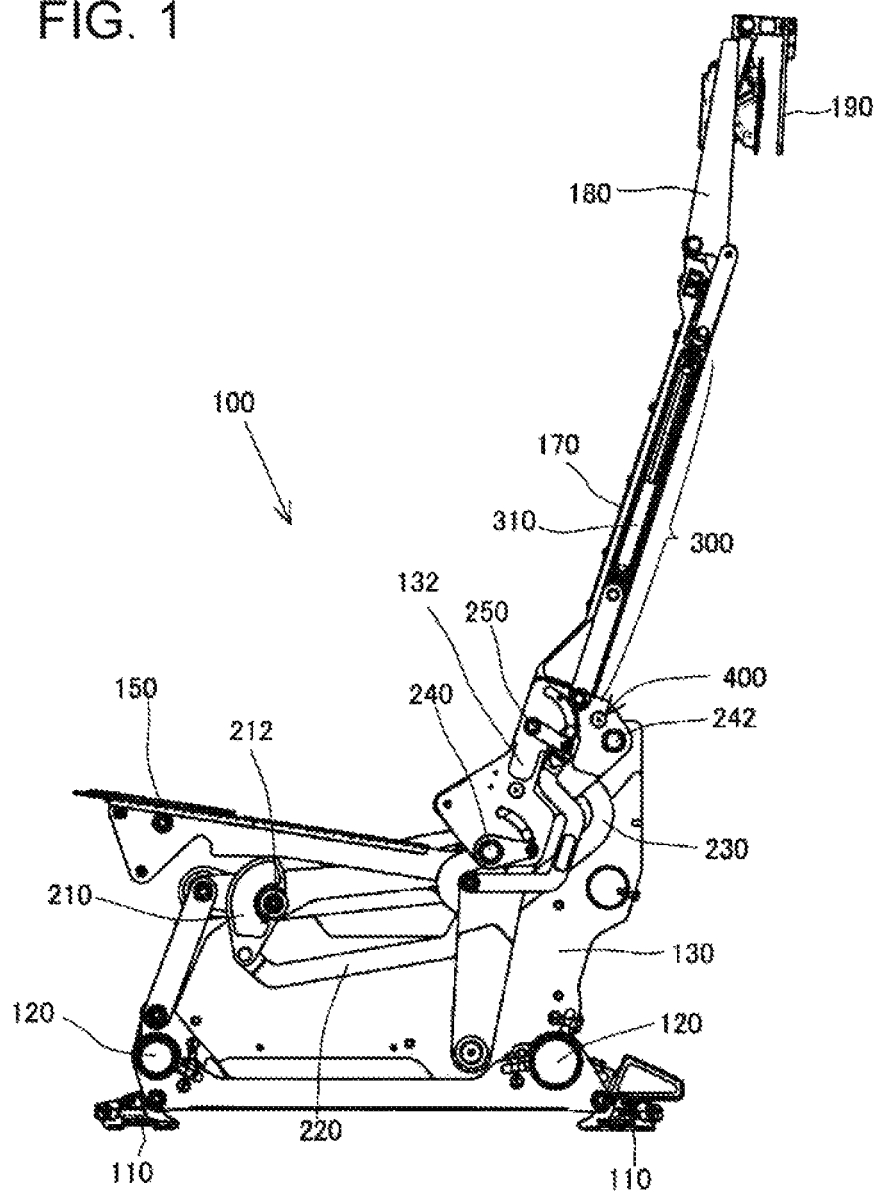
FIG. 1 is a side view of a main structure of an aircraft passenger seat according to the present invention.

In FIG. 1, an aircraft passenger seat 100 is fixed to a floor surface of an airframe via mounting members 110. The mounting members 110 support two pipes 120, and structural members of the seat are mounted to the two pipes 120.

Frames 130 called spreaders are provided on both sides of the structural members of the seat.

Cam grooves are formed on inner sides of the frames 130, and cam followers 240 and 242 are engaged to the cam grooves. When an actuator not shown is driven, the cam followers 240 and 242 move within the cam grooves and realize reclining of the seat.

A seat bottom frame 150 has a rear end portion attached rotatably to a tube that supports the cam followers 240 at both ends, and a lower side of the seat bottom frame is supported by an eccentric cam 210.

A seat back frame 170 is designed to tilt forward about a pin 250.

A head rest frame 180 is mounted to an upper end of the seat back frame 170, and an extension member 190 is attached storably to an upper end of the head rest frame 180.

When the seat back frame 170 is tilted forward, the movement is transmitted from a link plate 230 via a link plate 220 to the eccentric cam 210, and cause the eccentric cam 210 to rotate about a pin 212. At the same time, the tilting of the seat back frame 170 is transmitted to damper mechanisms 300 provided on both sides of the seat back frame 170, and compresses the dampers.

The damper mechanisms 300 have a function to prevent the seat back frame 170 from rapidly tilting forward in a manner described later, and to support the returning of the seat from a bed mode position to an upright position.

FIGS. 2 through 6 illustrate the steps of converting the seat from the upright position to the bed mode position.

Figure 2:
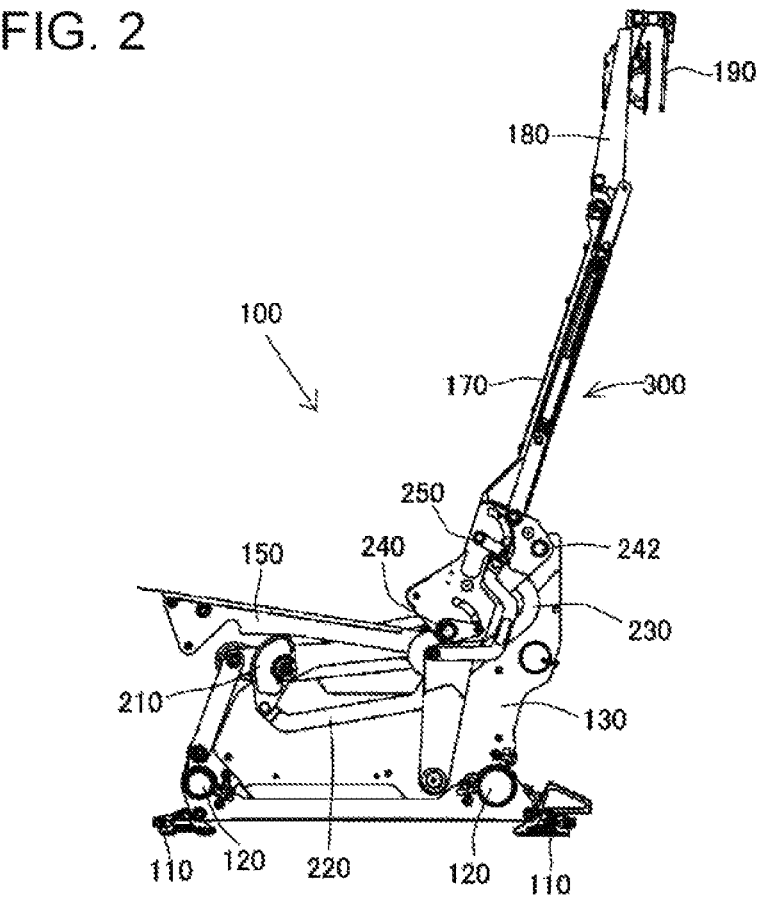
FIG. 2 is an explanatory view showing an operation of converting the aircraft passenger seat of the present invention from an upright position to a bed mode position.

FIG. 2 illustrates a state where the seat 100 is in an upright position. The passenger can use the seat 100 in a reclined state.

Figure 3:
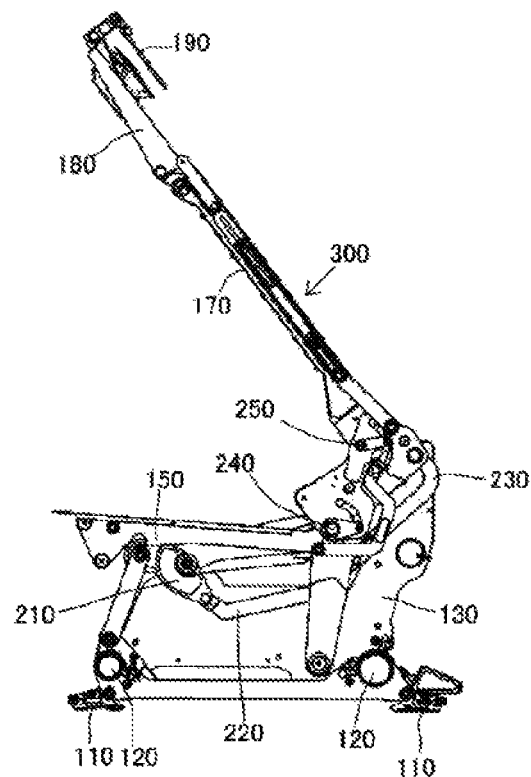
FIG. 3 is an explanatory view showing the operation of converting the aircraft passenger seat of the present invention from the upright position to the bed mode position.

FIG. 3 illustrates a state where a lock mechanism described later is released manually, and the seat back frame 170 is started to be tilted forward about the pin 250. The eccentric cam 210 supporting the seat bottom frame 150 is rotated, and an upper end side of the seat bottom frame 150 is lowered. At the same time, a link plate 350 starts compressing the damper mechanisms 300. The damper mechanisms 300 include a damper having gas or a coil spring sealed therein, and absorb energy corresponding to the amount of compression. The operation of the damper mechanism 300 enables the seat back frame 170 to tilt forward gently.

Figure 4:
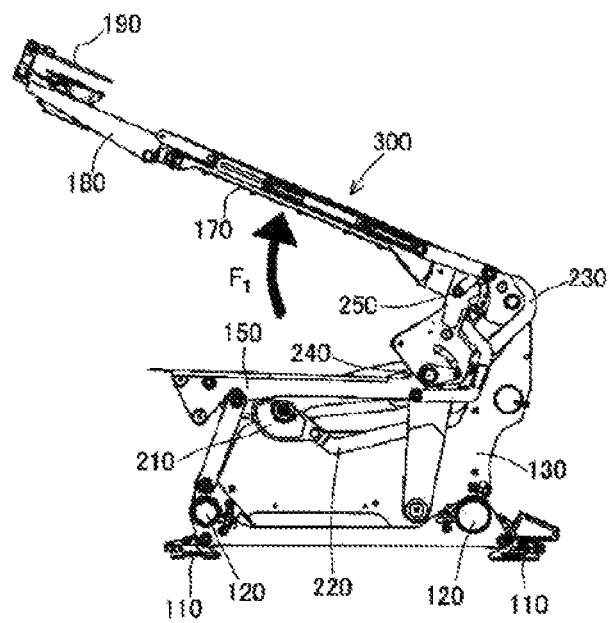
FIG. 4 is an explanatory view showing the operation of converting the aircraft passenger seat of the present invention from the upright position to the bed mode position.

FIG. 4 illustrates a state where the seat back frame 170 is tilted further forward. The front end side of the seat bottom frame 150 is further lowered, and the damper mechanism 300 is further compressed. Energy $F_1$ accumulated in the damper mechanism 300 assists the movement when the seat is returned to the upright position from the bed mode position.

Figure 5:
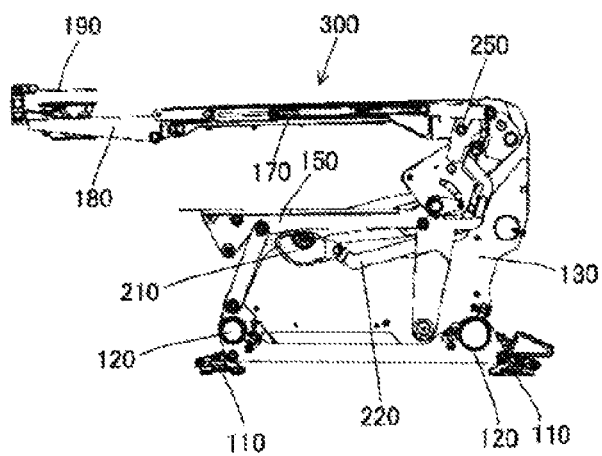
FIG. 5 is an explanatory view showing the operation of converting the aircraft passenger seat of the present invention from the upright position to the bed mode position.

In FIG. 5, the seat back frame 170 is tilted to the bed mode position, and a lock mechanism described later is operated. The upper end of the seat bottom frame 150 is lowered to a lowest position.

Figure 6:
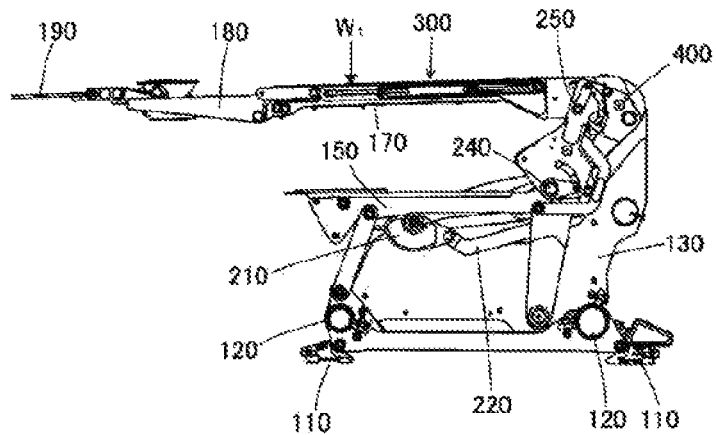
FIG. 6 is an explanatory view showing the operation of converting the aircraft passenger seat of the present invention from the upright position to the bed mode position.

FIG. 6 illustrates a position of arrangement of a lock mechanism 400. The extension member 190 connected to the upper end of the head rest frame 180 is pulled out to a position of use, by which a dimension of length of the bed is expanded.

Figure 7:
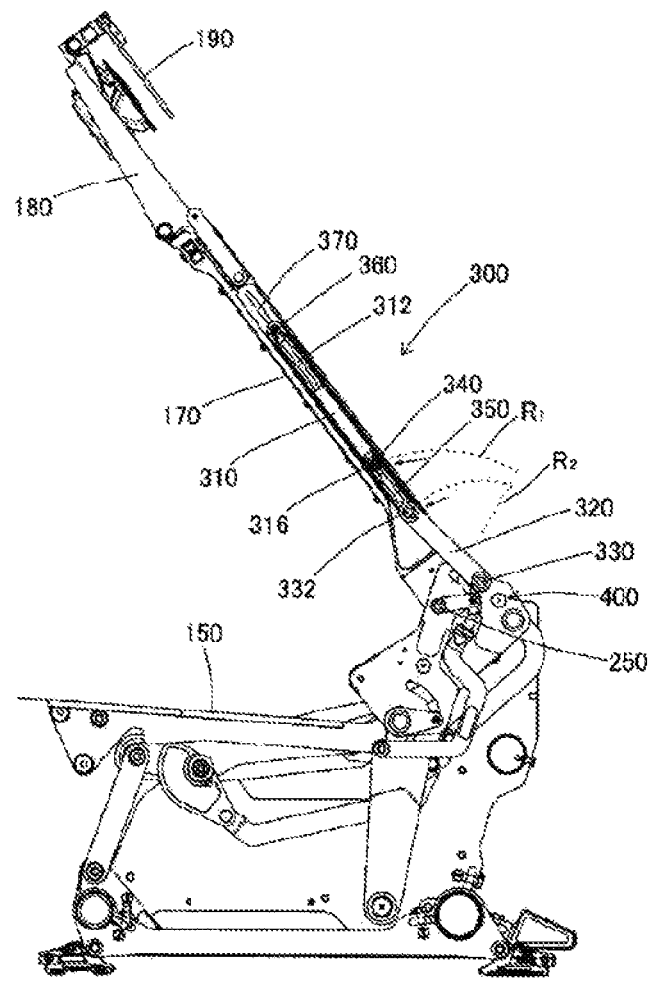
FIG. 7 is an explanatory view of a damper mechanism of the aircraft passenger seat of the present invention.
Figure 8:
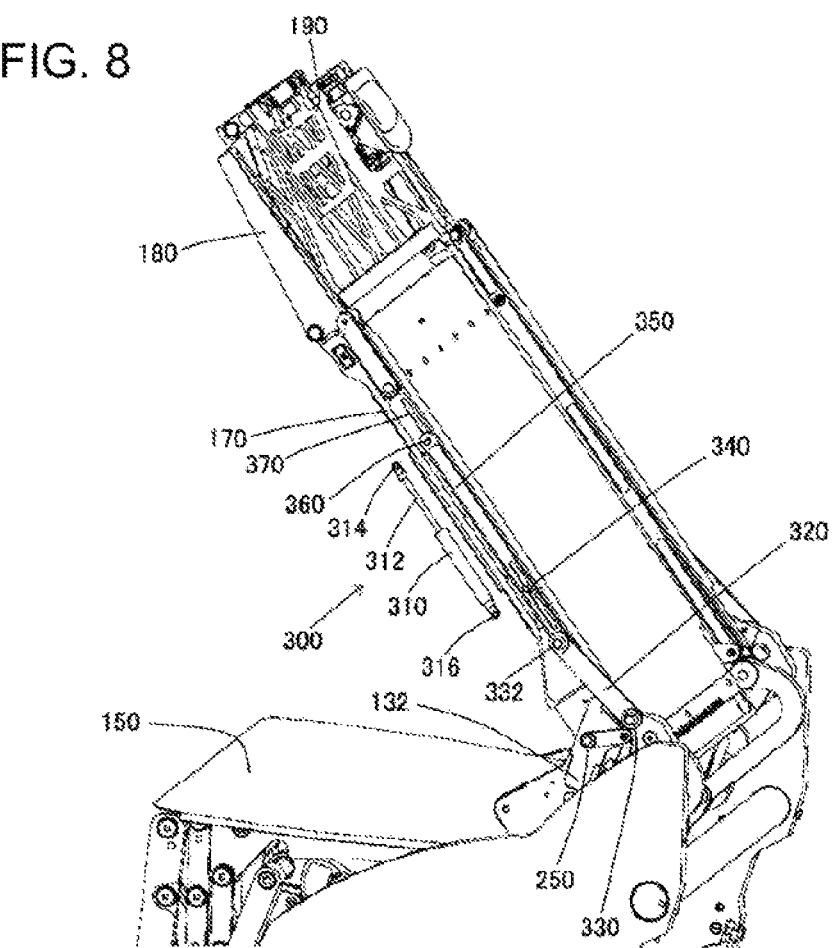
FIG. 8 is an explanatory view of a damper mechanism of the aircraft passenger seat of the present invention.

FIGS. 7 and 8 are explanatory views illustrating an arrangement of the damper mechanisms 300 and details of operation.

As illustrated in FIG. 8, a damper unit 310 is a type of a damper having gas sealed inside, and the gas sealed inside the damper unit is compressed and energy is stored when a rod 312 is pushed therein. Another type of damper unit can have a coil spring provided in the interior thereof.

Support points 314 and 316 for attachment are provided on both end portions of the damper unit 310.

The seat back frame 170 includes a fixing pin 340, and a support point 316 of the damper unit 310 is mounted thereto. The seat back frame 170 includes a slit 370, and a plate 350 is slidably attached to the slit 370. The plate 350 has a pin 360, and the support point 314 of the damper unit 310 is attached to the pin 360.

An end portion of the plate 350 is connected to a support point 332 of a link plate 320, and a support point 330 on the other end portion of the link plate 320 is connected to a fixture-side of a plate 132.

The seat back frame 170 tilts forward about a support point 250 following a locus of radius $R_1$. On the other hand, the link plate 320 revolves with a radius $R_2$. Since the radius $R_2$ is smaller than the radius $R_1$, the link plate 320 pulls the plate 350 toward the support point 332 corresponding to a difference in distance between $R_2$ and $R_1$.

By this operation, the rod 312 of the damper unit 310 is pushed in, and the sealed gas is compressed to store energy.

When the seat back frame 170 is returned from the bed mode position to the upright position, the energy stored in the damper unit 310 supports the force to move the seat back frame 170 back to the upright position.

Next, a lock mechanism locking the seat back frame 170 to the bed mode position will be described.

The lock mechanism 400 is mounted at locations illustrated in FIGS. 6 and 7.

Figure 9:
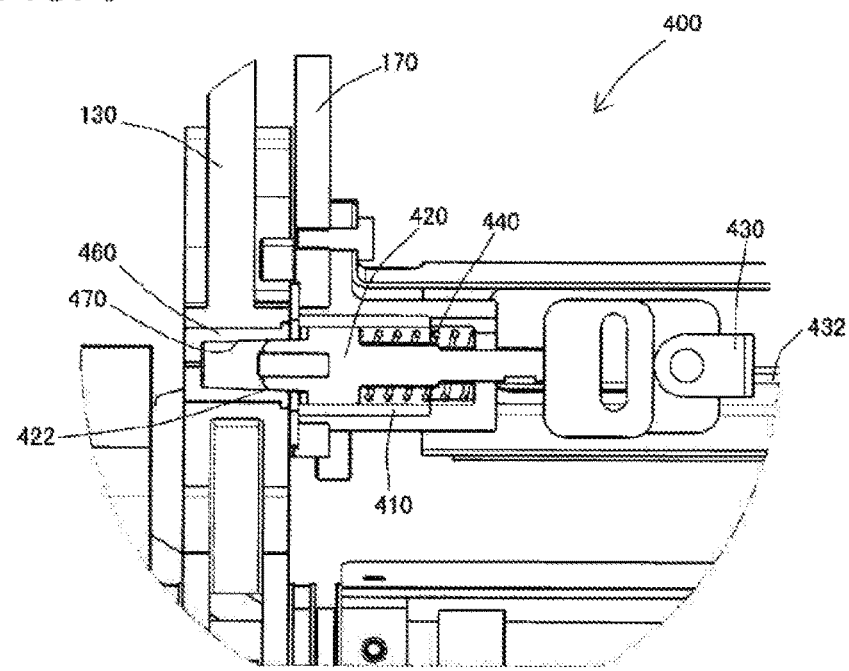
FIG. 9 is an explanatory view of a lock mechanism of the aircraft passenger seat of the present invention.

FIG. 9 is a cross-sectional view illustrating the details of the lock mechanism 400.

The lock mechanism 400 includes two receive members 460 provided on the frame 130, which is a fixed-side member, and a lock pin 420 arranged within a cylinder 410 provided on the seat back frame 170, which is a movable member. A handle not shown is connected via a wire 432 to a buckle 430. When a handle is operated manually, the buckle 430 pulls out the lock pin 420 from the receive member 460 against a spring 440. The receive members 460 are respectively arranged at a position where the seat back frame 170 takes the upright position and a position where the seat back frame 170 takes the bed mode position.

According to the lock mechanism 400, a tapered angle of a tapered surface 422 at a leading end of the lock pin 420 and a tapered angle of a receive surface 470 of the receive member 460 are formed the same. According to this arrangement, the lock pin and the receive member are engaged without a clearance. Therefore, the seat back frame 170 can be retained securely at the two positions. Especially when the seat back is positioned at the bed mode position, the seat back can support the weight of the passenger while preventing rattling.

Figure 10:
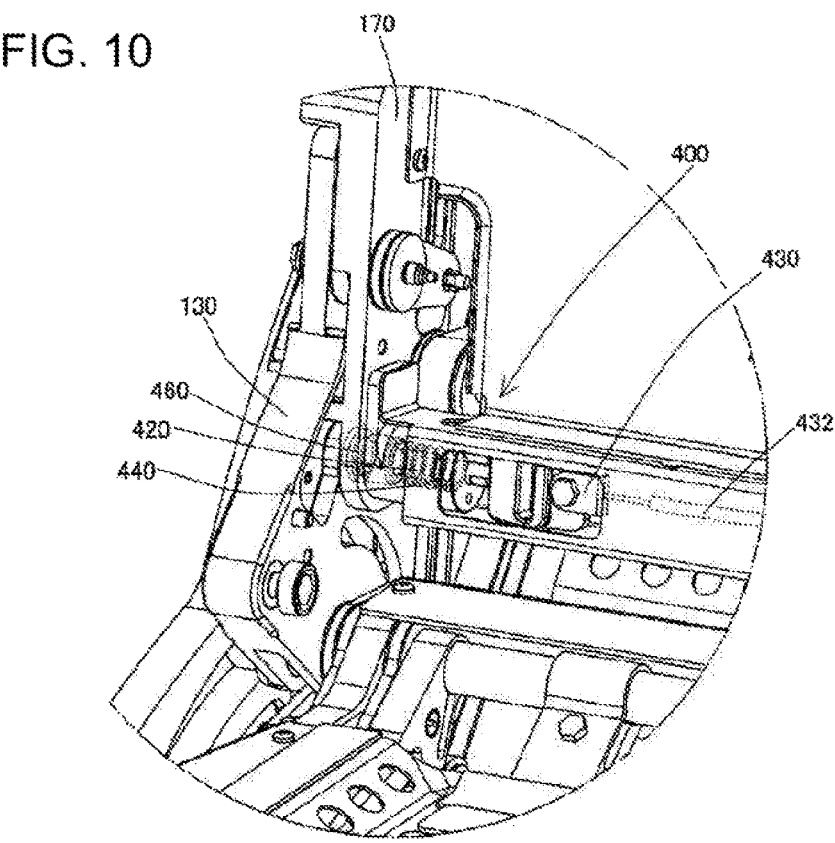
FIG. 10 is an explanatory view of a lock mechanism of the aircraft passenger seat of the present invention.

FIG. 10 illustrates a state where the passenger seat 100 according to the present invention is set to the upright position.

The lock pin 420 is inserted into the receive member 460.

Figure 11:
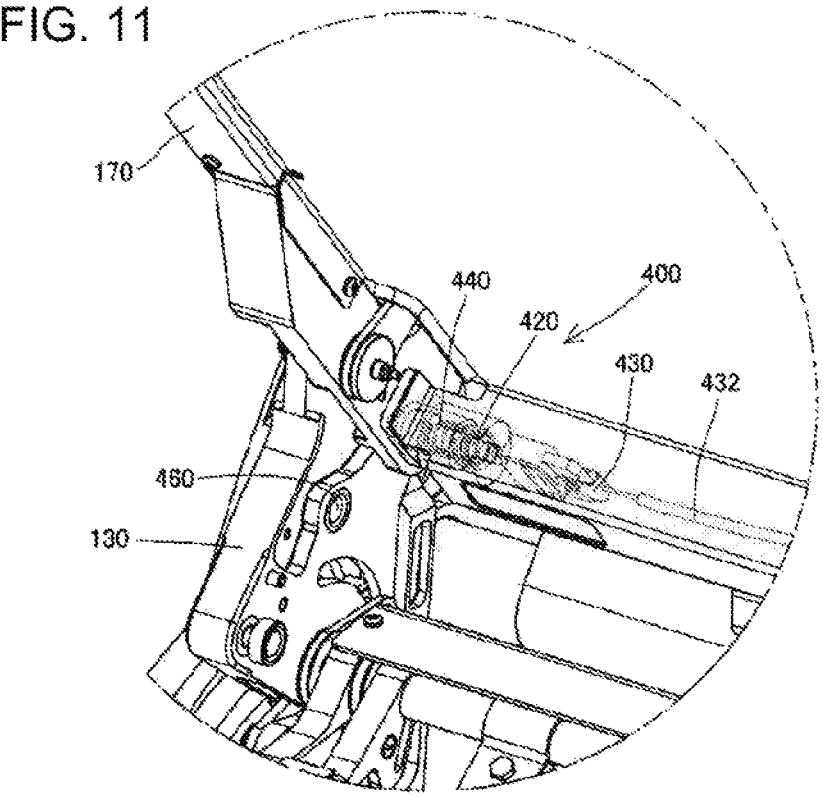
FIG. 11 is an explanatory view of the lock mechanism of the aircraft passenger seat of the present invention.

FIG. 11 illustrates a state where the lock mechanism 400 is operated and the lock pin 420 is pulled out of the receive member 460. In this state, the seat back frame 170 can be tilted.

Figure 12:
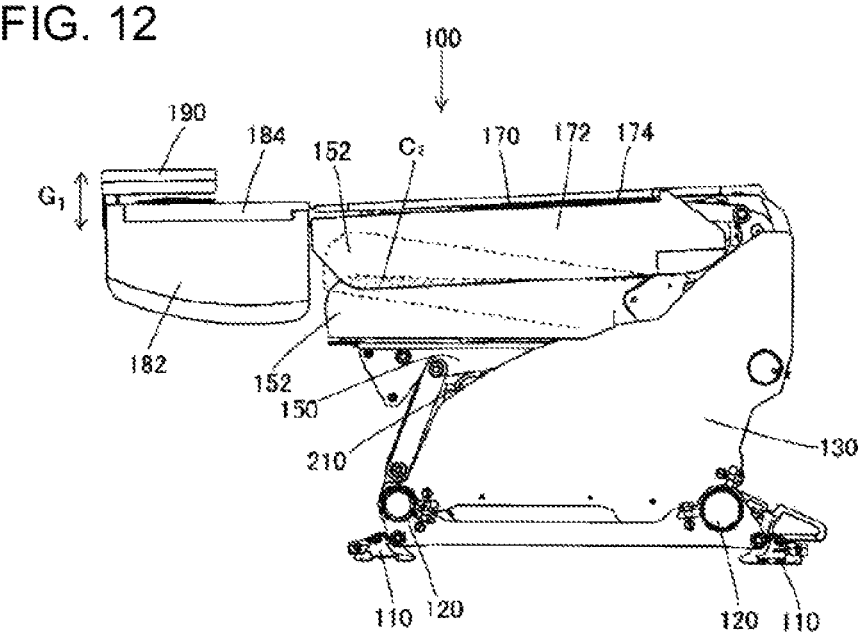
FIG. 12 is an explanatory view of a bed mode of the aircraft passenger seat of the present invention.
Figure 13:
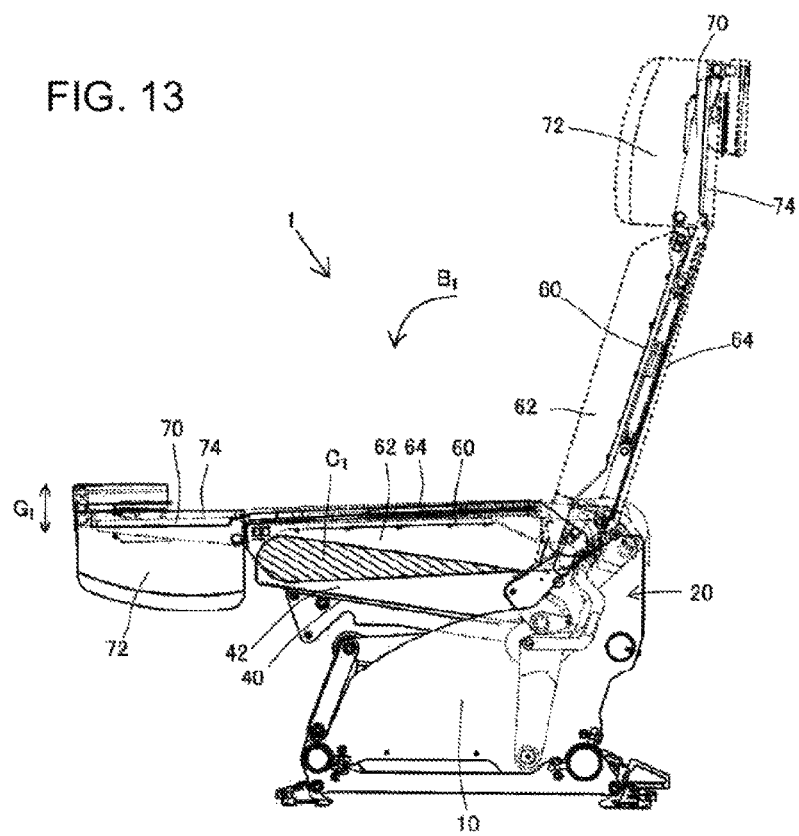
FIG. 13 is an explanatory view of the bed mode of the aircraft passenger seat of the present invention.

FIG. 12 illustrates a state where the passenger seat 100 according to the present invention is set to the bed mode position.

The seat bottom frame 150 is lowered, and a seat bottom cushion 152 is lowered to a positioned shown by a solid line from the position shown by a dashed line when the frame is in the upright position. In this position, there is smaller overlap $C_2$ of the seat back cushion 152 and the seat back cushion 172, and the cushions are prevented from being collapsed. The generation of a loosening $G_1$ is also prevented.

A bed cushion 174 provided on a rear surface of the seat back frame 170 and a cushion 184 provided on a rear surface of the head rest cushion 182 form a favorable bed surface.

REFERENCE SIGNS LIST

100 Aircraft passenger seat
110 Mounting member
120 Pipe
130 Frame
150 Seat bottom frame
170 Seat back frame
180 Head rest frame
190 Extension member
210 Eccentric cam
300 Damper mechanism
310 Gas damper
400 Lock mechanism
420 Lock pin
460 Receive member

The invention claimed is:

1. A bed mode mechanism for an aircraft passenger seat comprising:

a frame fixed to a floor surface of an aircraft and supporting two side portions of a structural member of a seat;

a seat bottom frame comprising a rear portion supported by a first support point on the frame;

an eccentric cam supporting a lower surface of the seat bottom frame;

a seat back frame comprising a lower portion and two opposing side portions, the lower portion being supported by a second support point on the frame;

a head rest frame connected to an upper portion of the seat back frame;

a lock mechanism for locking the seat back frame at an upright position when the seat back frame is positioned upright and a bed mode position when the seat back frame is tilted forward; and a damper unit including a damper mechanism provided on both side portions of the seat back frame, wherein the damper mechanisms are configured to be compressed and store energy when the seat back frame is tilted from the upright position to the bed mode position and assist a force when returning the seat back frame to the upright position.

2. The bed mode mechanism for an aircraft passenger seat according to claim 1, wherein the eccentric cam supporting the lower surface of the seat bottom frame is configured to rotate when the seat back frame is tilted from the upright position to the bed mode position and lower the seat bottom frame.

3. An aircraft passenger seat comprising a bed mode mechanism of claim 2.

4. The bed mode mechanism for an aircraft passenger seat according to claim 1, wherein the lock mechanism comprises two receive members provided on one of the frame side portions or two receive members provided on each of the two frame side portions, each receive member being configured to cooperate with a lock pin provided on the seat back frame, a spring biasing the lock pin toward the receive member, and a buckle connected to a handle for pulling out the lock pin from the receive member, and a taper angle of a tapered surface provided on a leading end of the lock pin and a taper angle of a tapered surface forming a receive surface of the receive member are formed approximately equal.

5. An aircraft passenger seat comprising a bed mode mechanism of claim 4.

6. The bed mode mechanism for an aircraft passenger seat according to claim 1, wherein the damper mechanisms are gas dampers.

7. An aircraft passenger seat comprising a bed mode mechanism of claim 6.

8. An aircraft passenger seat comprising a bed mode mechanism of claim 1.

* * * * *